US008762889B2

(12) United States Patent
Moore et al.

(10) Patent No.: US 8,762,889 B2
(45) Date of Patent: Jun. 24, 2014

(54) METHOD AND SYSTEM FOR DYNAMICALLY PLACING GRAPHIC ELEMENTS INTO LAYOUTS

(75) Inventors: Michael R. Moore, Folsom, CA (US); Daniel A. Kaye, Folsom, CA (US); Kenneth A. Turcotte, Folsom, CA (US); Peter A. Tjeerdsma, Fair Oaks, CA (US); Michael D. Wang-Helmke, Carmichael, CA (US); Christopher H. Davey, Sacramento, CA (US); Randy J. Jongens, Folsom, CA (US); Daniel N. Sashko, Roseville, CA (US)

(73) Assignee: Vidan Industries, Folsom, CA (US)

( * ) Notice: Subject to any disclaimer, the term of this patent is extended or adjusted under 35 U.S.C. 154(b) by 57 days.

(21) Appl. No.: 12/889,268

(22) Filed: Sep. 23, 2010

(65) Prior Publication Data

US 2011/0072376 A1    Mar. 24, 2011

Related U.S. Application Data

(60) Provisional application No. 61/245,266, filed on Sep. 23, 2009.

(51) Int. Cl.
*G06F 3/048* (2013.01)
(52) U.S. Cl.
USPC .......................... 715/838; 715/826; 715/765
(58) Field of Classification Search
USPC ................................ 715/838, 763, 859, 853
See application file for complete search history.

(56) References Cited

U.S. PATENT DOCUMENTS

| | | | |
|---|---|---|---|
| 4,835,712 A | 5/1989 | Drebin et al. | |
| 5,465,213 A | 11/1995 | Ross | |
| 5,544,306 A | 8/1996 | Deering et al. | |
| 5,644,661 A | 7/1997 | Smith et al. | |
| 6,139,152 A | 10/2000 | Ghahramani | |
| 6,185,589 B1 | 2/2001 | Votipka | |
| 6,389,467 B1 | 5/2002 | Eyal | |
| 6,392,665 B1 | 5/2002 | Argabright et al. | |
| 6,476,858 B1 | 11/2002 | Ramirez Diaz et al. | |
| 6,549,922 B1 | 4/2003 | Srivastava et al. | |
| 6,583,799 B1 * | 6/2003 | Manolis et al. | ............ 715/838 |
| 6,665,090 B1 | 12/2003 | Hall et al. | |
| 6,665,573 B1 | 12/2003 | Blackman | |

(Continued)

OTHER PUBLICATIONS

Macromedia Captivate 1.0: Using Captivate, User Guide [online], Macromedia, Inc., Apr. 2005, pp. 17-57 and 215-220.

(Continued)

*Primary Examiner* — William Titcomb
(74) *Attorney, Agent, or Firm* — Meyer IP Law Group (57) ABSTRACT

Techniques are described for dynamically placing graphical elements into theme layouts on a graphical user interface. A rendering engine reads a set of theme metadata and graphics metadata. The theme metadata defines a layout of the page and the regions into which the graphic elements will be placed. The theme metadata can further include tags to define categories or conceptual purposes for the regions and design changes that can be applied to graphics in that region. The graphics metadata defines a list of graphic files to be included in the layout, tags to define a category or conceptual purpose for each element and optional tags to override the design changes that are indicated in the theme metadata. The rendering engine combines and matches the theme metadata to the graphics metadata and places the graphic elements into the theme layout according to the matching.

25 Claims, 8 Drawing Sheets

(56) References Cited

U.S. PATENT DOCUMENTS

| | | | |
|---|---|---|---|
| 6,704,733 B2 | 3/2004 | Clark et al. | |
| 6,734,880 B2 | 5/2004 | Chang et al. | |
| 6,769,096 B1 | 7/2004 | Kuppusamy et al. | |
| 6,826,727 B1 | 11/2004 | Mohr et al. | |
| 6,956,589 B2 | 10/2005 | Lipsky et al. | |
| 7,019,864 B2* | 3/2006 | Delhoune et al. | 358/1.18 |
| 7,090,253 B2* | 8/2006 | Phillips et al. | 283/2 |
| 7,117,256 B1 | 10/2006 | Blinn | |
| 7,146,575 B2* | 12/2006 | Manolis et al. | 715/838 |
| 7,154,631 B2 | 12/2006 | Gonzalez et al. | |
| 7,230,628 B1 | 6/2007 | Haeberli | |
| 7,269,800 B2* | 9/2007 | Manolis et al. | 715/838 |
| 7,421,660 B2* | 9/2008 | Charnock et al. | 715/751 |
| 7,432,936 B2 | 10/2008 | Woodbury, Jr. | |
| 7,489,324 B2 | 2/2009 | Royal et al. | |
| 7,689,064 B2 | 3/2010 | Miksovsky et al. | |
| 2002/0040375 A1 | 4/2002 | Simon et al. | |
| 2002/0099696 A1 | 7/2002 | Prince | |
| 2002/0099731 A1 | 7/2002 | Abajian | |
| 2002/0123942 A1 | 9/2002 | Bridges, Jr. et al. | |
| 2002/0140702 A1 | 10/2002 | Koller | |
| 2002/0178950 A1* | 12/2002 | Delhoune et al. | 101/481 |
| 2003/0009469 A1 | 1/2003 | Platt et al. | |
| 2003/0052909 A1 | 3/2003 | Mo et al. | |
| 2003/0072486 A1 | 4/2003 | Loui et al. | |
| 2003/0110503 A1* | 6/2003 | Perkes | 725/86 |
| 2003/0173771 A1* | 9/2003 | Phillips et al. | 283/2 |
| 2004/0017390 A1 | 1/2004 | Knowlton et al. | |
| 2004/0019608 A1 | 1/2004 | Obrador | |
| 2004/0090468 A1 | 5/2004 | Cruikshank et al. | |
| 2004/0119726 A1 | 6/2004 | Li | |
| 2004/0160624 A1 | 8/2004 | Elgar et al. | |
| 2004/0199507 A1 | 10/2004 | Tawa, Jr. | |
| 2004/0267616 A1* | 12/2004 | Kargman | 705/14 |
| 2005/0102624 A1 | 5/2005 | McIntyre | |
| 2005/0165795 A1 | 7/2005 | Myka et al. | |
| 2005/0190280 A1 | 9/2005 | Haas et al. | |
| 2005/0210413 A1* | 9/2005 | Quek et al. | 715/838 |
| 2005/0210414 A1* | 9/2005 | Angiulo et al. | 715/838 |
| 2006/0064716 A1* | 3/2006 | Sull et al. | 725/37 |
| 2006/0197963 A1 | 9/2006 | Royal et al. | |
| 2007/0024631 A1 | 2/2007 | Cazier et al. | |
| 2007/0106690 A1 | 5/2007 | Denniston et al. | |
| 2008/0089612 A1* | 4/2008 | Isomura | 382/295 |
| 2009/0002386 A1* | 1/2009 | Jalon et al. | 345/581 |
| 2010/0013996 A1* | 1/2010 | Kang et al. | 348/553 |
| 2010/0077350 A1* | 3/2010 | Lim et al. | 715/810 |
| 2010/0088605 A1* | 4/2010 | Livshin et al. | 715/731 |
| 2010/0235312 A1* | 9/2010 | McCullough et al. | 706/47 |

OTHER PUBLICATIONS

Breeze 5 Integration Guide, User Guide [online], Macromedia, Inc., May 2005.

Sun, L. et al., Flipper: a New Method of Digital Document Navigation, 2005.

Altman, R., PowerPoint 2000/98: Visual QuickStart Guide, Peachpit Press, May 1999, pp. 2, 46, 70 and 71.

Wikipedia, Streaming Media, May 17, 2005, http://en.wikipedia.org/w/index.php? title=Streaming_media&oldid=13971634.

WebHostingTalk, Detect Internet Connection Type with PHP , Oct. 2004, http://www.webhostingtalk.com/archive/index.php/t-331520.html.

VelocityReviews, Auto Detection of Screen Resolution, Feb. 2005, http://www.velocityreviews.com/forums/t97495-auto-detection-of-screen-resolution.html.

RealNetworks, http://www.service.real.com/help/library/guides/ProductionGuide/prodguide/htmfiles/server.htm#69951, 2004, Chapter 21.

Inigo Surguy, Client-Side Image Generation With SVG and XSLT, http://web.archive.org/web/20040219193956/http://www.surguy.net/articles/client-side-svg.xml, Feb. 2004.

San Francisco State University, Mac OS The Desktop Operating System for Macintosh Computers, http://userwww.sfsu.edu/~training/mac%20os.pdf, Mar. 2004.

Deitel et al., Java How to Program 2002, Pretice Hall, Fourth Edition, p. 261.

* cited by examiner

FIGURE 1

Theme Metadata 200

| A:logo | B | C |
|---|---|---|
| H | I:mascot | D |
| G | F | E |

Graphics Metadata 202

Combined Result 204

Theme Metadata 600

| A:logo | B | C:school:slogan |
|---|---|---|
| H | I:school:mascot | D |
| G:sponsor | F | E |

Graphics Metadata 602

A:school:logo

\*:school:mascot

\*:sponsor:logo

\*:sponsor:mascot

FIGURE 6

Theme Metadata 700

| A:sponsor:logo | B | C:sponsor: slogan |
|---|---|---|
| H | I | D |
| G | F | E |

Graphics Metadata 702

*:sponsor:logo — weight=80; exclude=sponsor:slogan

*:sponsor:slogan — weight=50

Combined Result 704

METHOD AND SYSTEM FOR DYNAMICALLY PLACING GRAPHIC ELEMENTS INTO LAYOUTS

CLAIM OF PRIORITY

The present application claims the benefit of priority to U.S. Provisional Patent Application No. 61/245,266, entitled "A METHOD AND SYSTEM FOR DYNAMICALLY PLACING GRAPHIC ELEMENTS INTO LAYOUTS", by Peter A. Tjeerdsma et al., filed on Sep. 23, 2009, which is incorporated herein by reference in its entirety.

CROSS REFERENCE TO RELATED APPLICATIONS

The following U.S. patent applications are related to the present application, each of which is incorporated herein by reference in its entirety:

U.S. patent application Ser. No. 11/517,823, entitled "SYSTEMS AND METHODS FOR ORGANIZING MEDIA BASED ON ASSOCIATED METADATA", inventors Michael R. Moore, et al., filed on Sep. 7, 2006;

U.S. patent application Ser. No. 11/711,550, entitled "SYSTEMS AND METHODS FOR DYNAMICALLY DESIGNING A PRODUCT WITH DIGITAL CONTENT", inventors Michael R. Moore, et al. filed on Feb. 26, 2007;

U.S. patent application Ser. No. 11/437,207, entitled "SYSTEMS AND METHODS FOR WEB SERVER BASED MEDIA PRODUCTION", inventors Michael R. Moore, et al. filed on May 19, 2006; and U.S. patent application Ser. No. 12/156,321, entitled "SYSTEMS AND METHODS FOR RENDERING MEDIA", inventors Michael R. Moore, et al. filed on May 31, 2008.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to software for designing and customizing printed products, such as photobooks, posters, calendars and the like.

BACKGROUND

In recent years, digital photography and online photo sharing have become widely popular amongst users for a multitude of reasons, such as ease of use, flexibility in editing, and centralized access to one's photos. Conventionally, photo sharing has been enabled through websites or software applications that facilitate the upload and display of images and also allow individuals to control access to their photographs by other users. Other forms of software can also be found on the internet, which allows users to generate their own photo albums, usually to share photos on the web, using a home web server.

Even with the rising popularity of digital forms of photography, however, a large number of people still enjoy the look and feel of traditional printed photo albums and other forms of printed media, such as posters, calendars and the like. For example, a number of photo sharing websites now enable an individual to compose a photo album online from his or her own photos and to have it printed and shipped to the individual's location. These websites typically also allow a user to select a particular theme for their photo album, where the theme may include certain images or designs associated with it. Examples of such themes may include football, basketball, tennis (sports themes), as well as Christmas, Easter, birthday (holiday themes) and the like.

Traditionally, design templates for such themes of printed media have been created by a graphic designer to predefine the layout and appearance of the various design elements for a given market (e.g. sports logos, branding, theme park characters, sponsor logos, etc.) including such things as placement, priority and aesthetics (rotation, transparency, etc). However, such predetermined templates are often limited and restrictive in terms of customization, flexibility and variation. There exists significant space for potential improvement in this field with respect to more dynamic creation of new themes, simplified end-user modifications of existing themes and the automation of processes for general design of subject matter for printed media.

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

In various embodiments of the invention, a dynamic placement of graphic elements into generic theme layouts is described, which can be based on a set of metadata-driven rules. Such dynamic placement can eliminate the need for a designer to individually compose theme layouts that include each set of graphics. This can greatly speed up the time required to compose one or a multitude of final theme based products for any given market, with resultant advantages in time to market and reduced cost, and allow a user with no technical or design expertise to automatically generate a final product on-the-fly, by simply choosing a desired theme and a desired graphic set, or even simply select a single product from an online catalog that predefines all of the above, but still allows the user to move selected graphics or add their own images.

In various embodiments, this dynamic placement system can also allow for a consistency of "Visual Language" to be enforced throughout the products ultimately produced. In addition, a third party content provider such as a corporation, sports team, or event sponsor will likely have rules and requirements with regards to presentation of their graphic material. For example, the rules and placement mechanisms allow for the requirements of each individual sponsor to be met as needed for their branding requirements, giving the final products the "look and feel" that the sponsor is looking for, automatically and without requiring human intervention. Rules may also provide an acceptable range of limitations to available layout or design parameters that can be applied to selected graphic elements, thereby allowing end-user customization while preventing violation of the content provider's presentation requirements.

The various embodiments include a Rendering Engine and supporting Graphical User Interfaces (GUIs), to allow the selection of one or more theme layouts from a Theme file, and graphic elements for rendering over that background identified by a "Graphic Set" file, and optionally user-provided images to be included in the final layout.

In accordance with an embodiment, the Rendering Engine can be configured to define multiple regions of the layout for placing graphics within a theme (for example a 3×3 grid resulting in 9 regions), supporting unique placement rules for each variation in the theme if supported by the theme used. In accordance with an embodiment, theme variation includes variation of images or other content within a given theme. For example, within a football theme, variations might be applied for different pages of a photo book or months of a calendar, and might include a change of background images and generic elements such as pictures of a football, a football field, goalposts, and so on, but, in certain embodiments, would contain no imagery specific to a particular sports team or sponsor.

In various embodiments, metadata may be added to a theme to define:
  Available regions on each layout for placing the additional graphics from the graphic set.
  Tags to define conceptual purposes for each region (logo, slogan, mascot, etc), and/or to define arbitrary categories (i.e. alphanumeric codes).
  Design changes to be applied to graphics in that region (rotation, size, transparency, and the like).

In accordance with an embodiment, if the theme supports multiple variations, each variation may contain its own region metadata.

Additionally, graphic sets may be created, and may contain metadata to define:
  A list of the graphic files to be included in the set (URL, file path etc)
  Tags to define conceptual purposes for each graphic element (logo, slogan, mascot, etc), and/or to define arbitrary categories (i.e. alphanumeric codes).
  Optional tags to override theme variation design change attributes (i.e., a sponsor might never want their logo to be rotated, and/or might want it to only appear in a specific position or relative size)

In accordance with an embodiment, the Rendering Engine combines the theme metadata and the graphic set metadata to determine which graphics appear in which regions of the theme, and further rendering parameters. In this particular embodiment, the matching of the metadata determines if a given graphic can be placed in a given region using the following rules:
  Region tags must match. A wildcard character, such as "*" can be used to allow more freedom of matching. For example, the wildcard character can be used to force a match between a region and a graphic element.
  Categories or conceptual tags must match
    Sub-categories can be supported, such as school:logo, school:mascot, sponsor:logo, sponsor:slogan, and the like.
    Similar to region tags, wildcards may be used to force a match at any level of the hierarchy.
  Multiple categories or conceptual tags may be applied to a given region in either the theme or graphic element in the set, to support multiple purposes.
  Algorithms can be used to determine priority in cases of multiple matches:
    Weighting of tag matches can be used—highest weighted graphic can obtain priority, or probability of appearing on a given page proportional to tag weights.
    In cases of multiple matches due to wildcards or equal tag weight, randomness, round-robin, etc can be used to break the tie.
    Explicit weighting may be assigned in the graphic metadata
  Algorithms may be used to support other conditional placements. For example, a given graphic may prohibit the placement of one or more other graphics by specifying tags to exclude the other graphics.

It should be noted that the rules listed above illustrate just one of many possible embodiments and that numerous variations of such rules are possible within the scope of the present invention.

In various embodiments, additional metadata can also be used to control other behaviors of the Rendering Engine, such as how the end-user might be allowed to interact with the automatically placed graphics. For example, metadata tags such as "user=move", "user=rotate" or "user=size" might be used to respectively allow the user to move, rotate and size the graphic so tagged. Such tags could be used to enforce branding rules on specific graphics in a set, while still letting the user customize their product by changing such layout parameters on other graphics for which the branding rules may not be as strict.

According to some example embodiments, the theme metadata and the graphic element metadata are created by one or more designers with specialized skills, for later use by an end-user customer, while an end-user with no special skills merely selects a theme and a graphic set (by using a computer software interface installed on a home or business computer, web page, or in-store kiosk, see cross-referenced U.S. patent application Ser. No. 11/437,207) to be automatically combined into the product they are interested in, with no further effort required. Predefined projects are also supported, wherein the end-user simply selects a desired product from a catalog, for which the theme and the graphic set are predetermined. The end user may or may not also be allowed to select their own personal photos for inclusion in the composition of the final product, or be provided access to a restricted photo library associated with that product.

One or more designers that generate the metadata might work for a company that arranges for the use of the graphic elements from various third-party entities (corporations or sports teams, for example). In accordance with an embodiment, the designer compiles the desired graphic elements into a graphic set, and selects the themes and theme variations to be used with that graphic set. The designer creates the metadata in a way that controls the artistic and tasteful merging of the graphic elements with the desired theme (including any variations), and enforces whatever branding rules the sponsor might require to achieve their consistency of Visual Language across all possible products to be created.

In other embodiments, the software can be designed with a graphical user interface to allow a non-technical user to generate the theme metadata and graphic metadata without directly dealing with the complexity of the metadata structures. This supports the selection of one or more desired themes, selection of one or more graphic elements for the set, and using graphical user interface tools to enter the desired metadata tags and parameters for each. Software can also be written to allow a user to compose their own themes (possibly including theme variations) and include metadata tags that would control the merging and composing of final theme instances created from specific graphic data sets that include the proper metadata as described in this patent. In these cases, the skill requirements of the user would be increased beyond what an average end-user customer might have, and therefore might be targeted more toward users familiar with businesses or media software usage.

Figure 1:
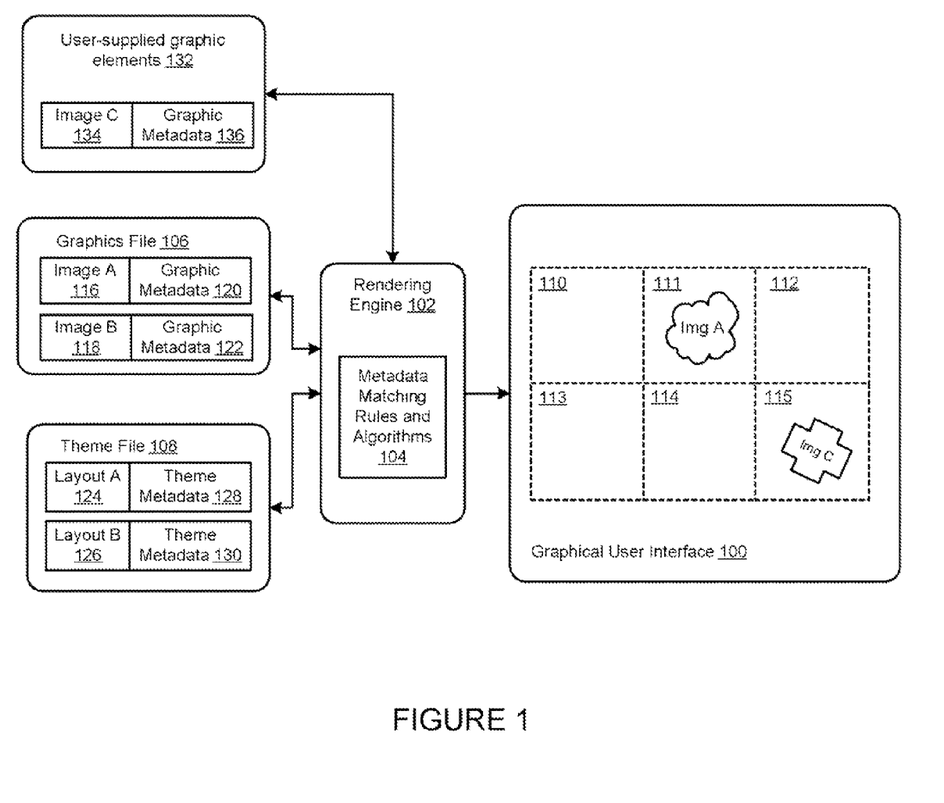
FIG. 1 is a high level diagram of a system for dynamically placing graphic elements into layouts, in accordance with various embodiments of the invention.

FIG. 1 is a high level diagram of a system for dynamically placing graphic elements into layouts, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the system includes a graphical user interface (GUI) 100 for displaying a page that will eventually be rendered on an article of a printed media, such as a photo album, a calendar or a poster. The system further includes a Rendering Engine 102 that can allow a non-technical user to select a theme (or theme variation) and dynamically place graphic images and other elements into the theme for the page being displayed. In order to perform this, a user may select a particular theme layout (124, 126) from a theme file 108.

Each theme has metadata (128, 130) associated with it that defines the layout of the display page. For example, as illustrated in FIG. 1, the selected layout defines a 2×3 grid of six regions (110-115) for rendering the various graphic elements onto page. It is noted that the grid illustrated in this figure is only one example and many other such examples are possible within the scope of the invention. For example, other layouts may include larger grids of substantially more regions, may use X and Y coordinate systems, or employ some other techniques to define the positioning the graphic elements on the screen.

Continuing with the illustration, the Rendering Engine 102 may also read a number of graphical images or other elements from a graphics file 106 supplied with the system or may obtain the graphic elements from a user 132. In the illustration of FIG. 1, the graphics file includes images A and B (116, 118) that have graphic metadata (120, 122) associated therewith. In accordance with the embodiment illustrated in FIG. 1, image A is associated with metadata 120 and image B is associated with its own specific metadata 122. Furthermore, as illustrated, the user has provided their own image C 134, along with its metadata 136 to be included in the layout. The Rendering Engine processes the theme metadata and the graphics metadata and places the graphic elements into the layout according to the combined metadata. For example, based on the analysis of the graphics metadata and the particular selected theme, the Rendering Engine positions image A in region 111 and places image C in region 115.

Furthermore, the Rendering Engine 102 has a set of rules and algorithms 104 to select between multiple graphic elements that may match a particular region of the layout. For example, image B is not shown as having been rendered on the page as it may not have matched any region of the layout or it may have been excluded by the higher-weighted user image C, as specified by the graphic metadata associated with image C 136. The matching, overriding and weighting features will be described in further detail, with reference to examples in FIGS. 2-7 below.

Figure 2:
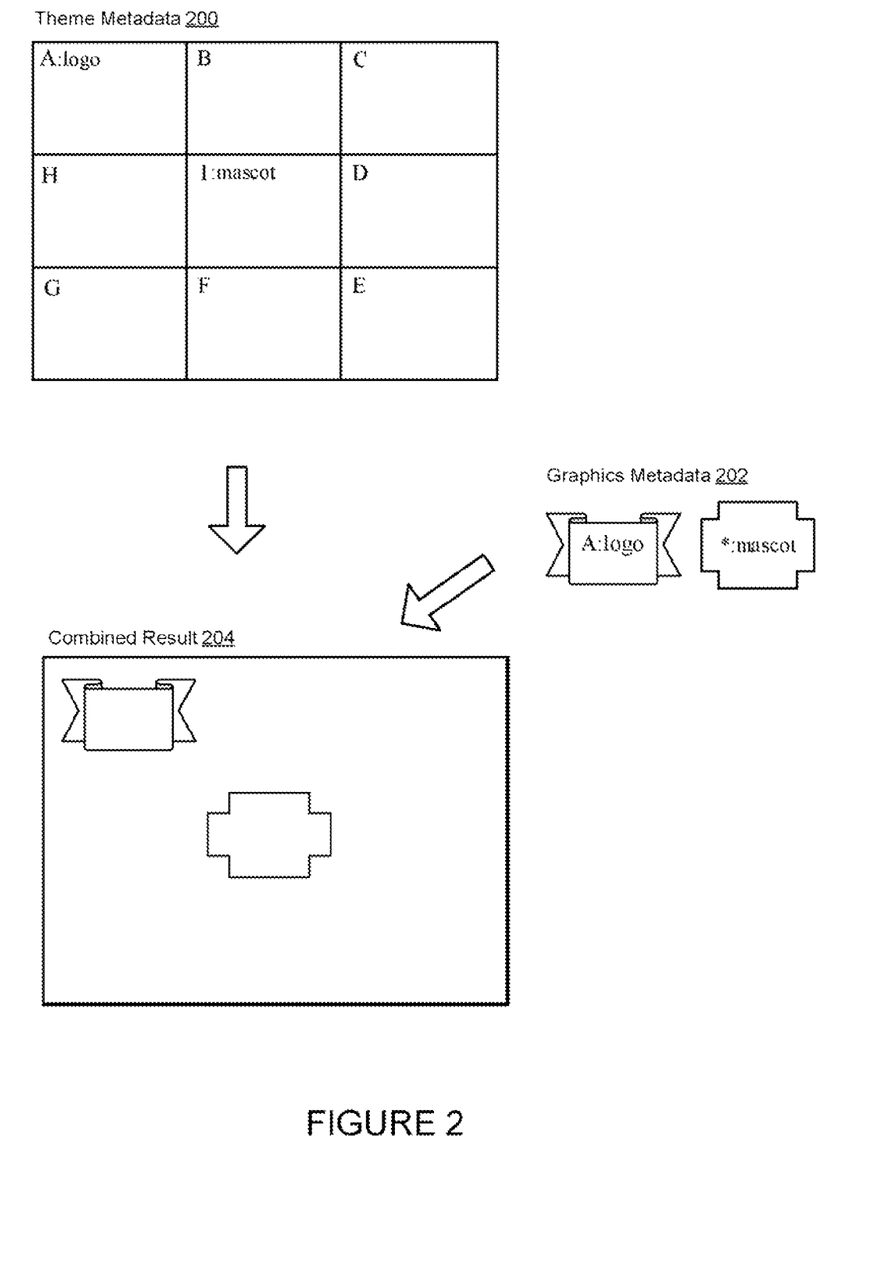
FIG. 2 is an example of basic placement of graphic elements into a layout, in accordance with various embodiments of the invention.

FIG. 2 is an example of basic placement of graphic elements into a layout, in accordance with various embodiments of the invention. Although this example and subsequent examples depict the graphic elements being positioned in a particular manner, it is noted that neither the positioning of the elements, nor the layout itself is intended to be limiting of the invention. Various alternative illustrations are possible and well within the scope of the present disclosure.

As illustrated, the theme metadata 200 is an example of metadata associated with one theme (or one variation in a theme) and its use to define regions where graphic elements can be placed if the graphic metadata matches. In this particular example, the theme variation is divided into a 3×3 grid providing 9 regions, labeled in clockwise order from A to I, with I at the center of the layout. An example metadata string for the theme is "A:logo, I:mascot". Thus, each region contains metadata that defines the matching elements required for placement in that region. In this case region A contains a single tag for "logo", and region I contains a single tag for "mascot".

As further illustrated, the graphics metadata 202 associated with two graphic elements in a graphic set can be used to define where each graphic would be placed when its metadata matches the theme metadata. In this example, the use of a "*" wildcard character will force a match. Thus, in this case, the system determines that the logo can only appear in region A of a theme, while the mascot can appear in any region of a theme.

A metadata string for the graphic elements in this example set might look like the following (specifying the URL or file path for each image, as well as the control parameters for each element):

[URL path]/SchoolLogo1.jpg (A:logo)
[URL path]/SchoolMascot1.jpg (*:mascot)

The combined result 204 is an example page displayed after the metadata has been combined, and the graphics rendered into that theme variation by the Rendering Engine. It should be noted that in this and subsequent illustrations, generic elements in the theme layouts or any other elements such as photos added by the user are not illustrated.

As shown in the combined result 204, the graphics metadata associated with the logo graphic element matched the metadata associated with region A and thus the logo was displayed in this region of the layout. Similarly, the metadata associated with the mascot graphic element included a wild card that matched any region and therefore the mascot was rendered on region I of the layout. A graphic with the metadata string such as "C:logo" would not appear in the above example because the region "C" did not contain any metadata, and therefore would not be matched by the graphic metadata. Conversely, if the logo graphic had used a wildcard in the metadata such as "*:logo" it would match any region, and in this case it would again appear in region A.

Figure 3:
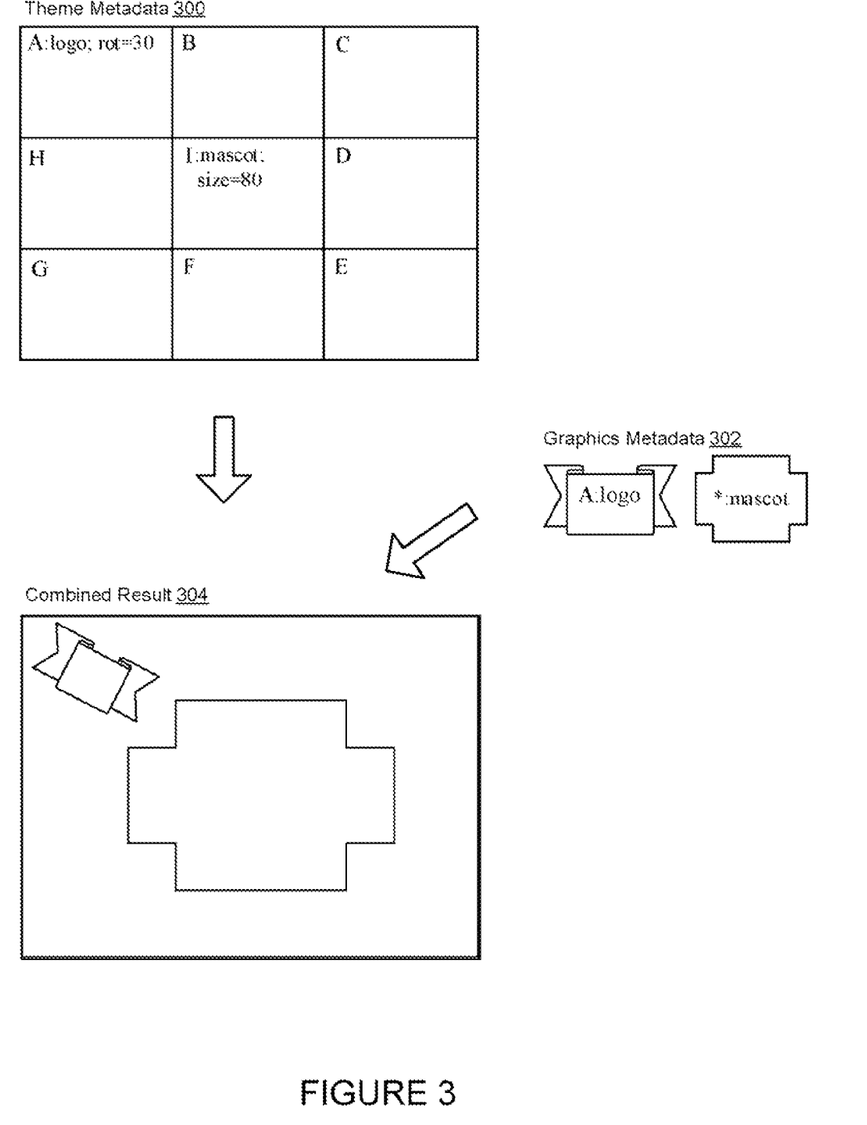
FIG. 3 is an example of placement with effects, in accordance with various embodiments of the invention.

FIG. 3 is an example of placement with effects, in accordance with various embodiments of the invention. In this example, additional theme metadata 300 is used to control graphic effects to be applied to each region, such as rotation, size, transparency, and the like. An example metadata string for the theme can be: "A:logo; rotation=30; I:mascot; size=80". In this example, rotation is expressed in degrees, and size is expressed in a percentage of the overall output page size.

In various embodiments, each region may contain default values for these parameters. In this example, these might be: rotation=0; and size=33 (due to the 3×3 grid). Other effects parameters that could be controlled by metadata might include such effects as transparency, blur, color tinting, and so on, each having a default value of no effect being applied.

As illustrated, the graphic metadata 302 is unchanged from the previous example. The complete metadata string for the graphic elements in this example set would still look like the following:

[URL path]/SchoolLogo1.jpg (A:logo)
[URL path]/SchoolMascot1.jpg (*:mascot)

The combined result 304 illustrated the page after the metadata has been combined, and the graphics rendered into that theme variation by the Rendering Engine. As shown in the result, the logo has been rotated by the specified degrees, and the mascot has been sized to the specified percentage of the page size.

Figure 4:
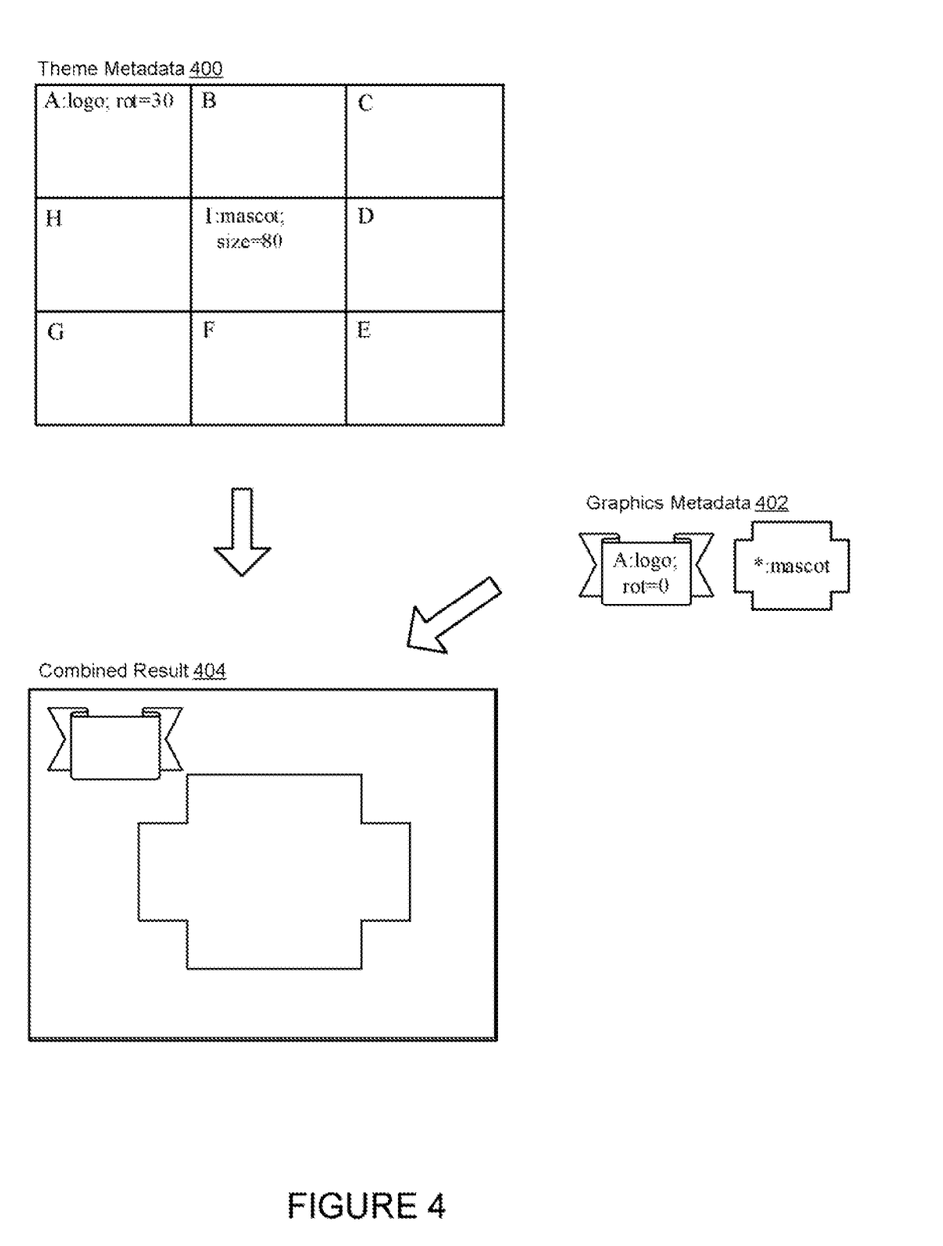
FIG. 4 is an example of graphic data override, in accordance with various embodiments of the invention.

FIG. 4 is an example of graphic data override, in accordance with various embodiments of the invention. In this example, similarly to the example in FIG. 3, additional metadata 400 is used to control graphic effects to be applied on each region, such as rotation, size, transparency, etc. However, in this case the graphic metadata 402 will contain a rotation override parameter. This might be used, for example, if the theme was designed to apply rotation, but a sponsor did not want their logo to ever be rotated. An example metadata string for the theme (same as the previous example) could be: "A:logo; rotation=30; I:mascot; size=80".

The graphic metadata 402 in this case is similar to the previous example, but with the rotation override applied to the logo. As such, the complete metadata string for the graphic elements in this example set might look like the following:

[URL path]/SchoolLogo1.jpg (A:logo;rotation=0)
[URL path]/SchoolMascot1.jpg (*:mascot)

The combined result 404 shows the page after the metadata has been combined, and the graphics rendered into that theme variation by the Rendering Engine. As shown in the result, despite the theme metadata containing the rotation=30 parameter, the end result honors the graphic metadata rotation parameter rotation=0.

Figure 5:
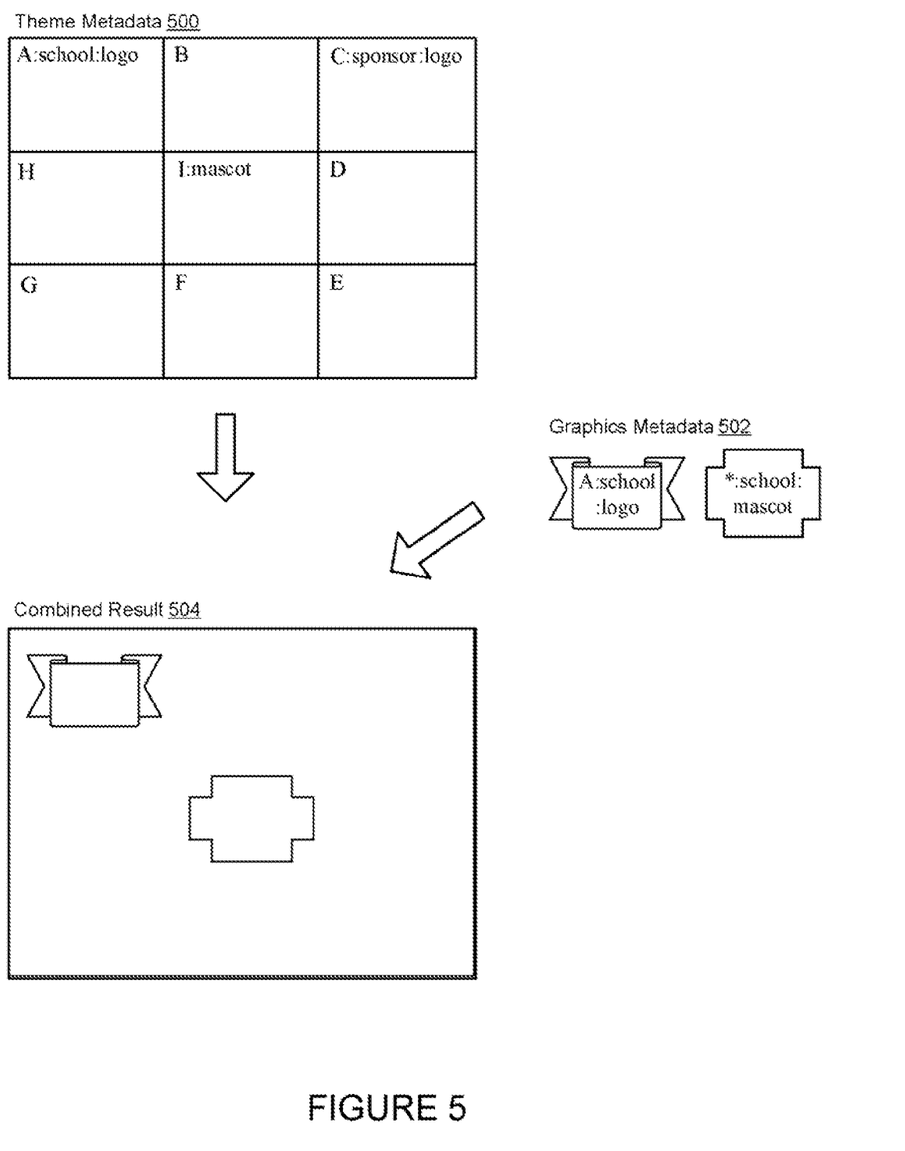
FIG. 5 is an example of metadata hierarchies and subcategories, in accordance with various embodiments of the invention.

FIG. 5 is an example of metadata hierarchies and subcategories, in accordance with various embodiments of the invention. The metadata hierarchies allow finer control of the placement of graphic elements when needed, while also allowing more general matching when desired. As illustrated, an example metadata string for the theme 500 is: "A:school:logo; C:sponsor:logo; I:mascot". Thus, two types of logo spaces are allocated in the layout, one for the school logo and one for the sponsor logo.

The graphic metadata 502 in this case is the same as the first example shown in FIG. 2, but with the additional attribute of "school" added. As such, the complete metadata string for the graphic elements in this example set might look like the following:

[URL path]/SchoolLogo1.jpg (A:school:logo)
[URL path]/SchoolMascot1.jpg (*:school:mascot)

The combined result 504 shows the display of the page after the metadata has been combined, and the graphics rendered into that theme variation by the Rendering Engine. As evident in the result, the school logo matched the theme for region A only, because region C only allowed for sponsor logos. The school mascot matched the theme for region I because the theme metadata for region I allowed for any mascot type. If a general (unspecific) logo had been defined, it could appear in either region A or region C. Similarly, if a sponsor logo had also been defined, it would appear in region C, opposite the school logo.

Figure 6:
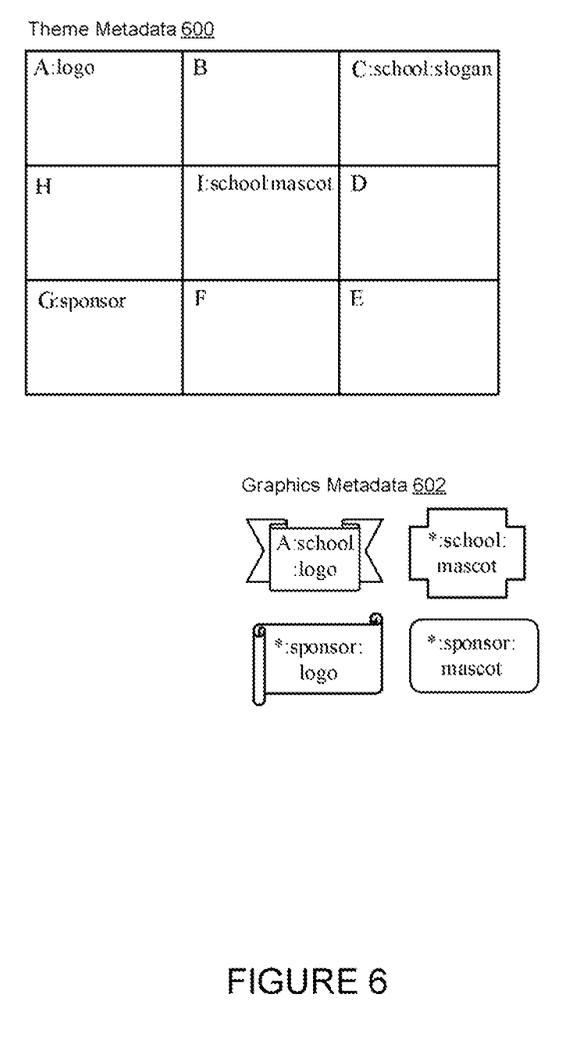
FIG. 6 is an example of multiple match strategies, in accordance with various embodiments of the invention.

FIG. 6 is an example of multiple match strategies, in accordance with various embodiments of the invention. More specifically, this example illustrates the case where the metadata of multiple graphic elements matches the metadata for a single theme region. As shown in the example, the metadata string for the theme 600 is: "A:logo; C:school:slogan; I:mascot; G:sponsor".

In this case, the graphic metadata 602 is the same as the previous example of FIG. 5 but with two new graphic elements added as illustrated. The complete metadata string for the graphic elements in this example set might look like the following:

[URL path]/SchoolLogo1.jpg (A:school:logo)
[URL path]/SchoolMascot1.jpg (*:school:mascot)
[URL path]/SponsorLogo1.jpg (*:sponsor:logo)
[URL path]/SponsorMascot1.jpg (*:sponsor:mascot)

In this case the result is not shown, because the rules lead to multiple matches and there is not necessarily a single final result. Rules can be coded into the Rendering Engine to control the default behavior in these cases, or may be provided by a separate Matching Rule file. In this example, theme region A will match both the school logo and the sponsor logo. It may not be appropriate to place them both on top of each other, so a default strategy might be to randomly pick one of the matching graphic elements. Another might be to alternate "round robin" style amongst all matching graphic elements for each theme variation in a given product. A third possibility might be to include some sort of "weighting" of importance for each graphic element such that the element with the highest weight wins.

In this illustration, theme region G will match any sponsor graphic element, and we have both a logo and a mascot here. The same weighting or random selection strategies could be used in this case to pick one or the other.

Furthermore, it may be desirable to include metadata to control the likelihood or probability that a given graphic element appear should multiple matches be found. This could be used to increase the likelihood of picking a sponsor logo over a school logo (for example) while not completely overruling the school logo entirely.

It is also possible to include multiple graphic elements with identical metadata. For example, a school mascot might have several versions; say a front view and a side view, and/or different poses. For each theme variation, since any of these mascot versions will match any region that will accept them, the same strategies can be used to alternate between them, automatically providing variety to the finel design, while still holding true to the branding rules expressed in the metadata.

Figure 7:
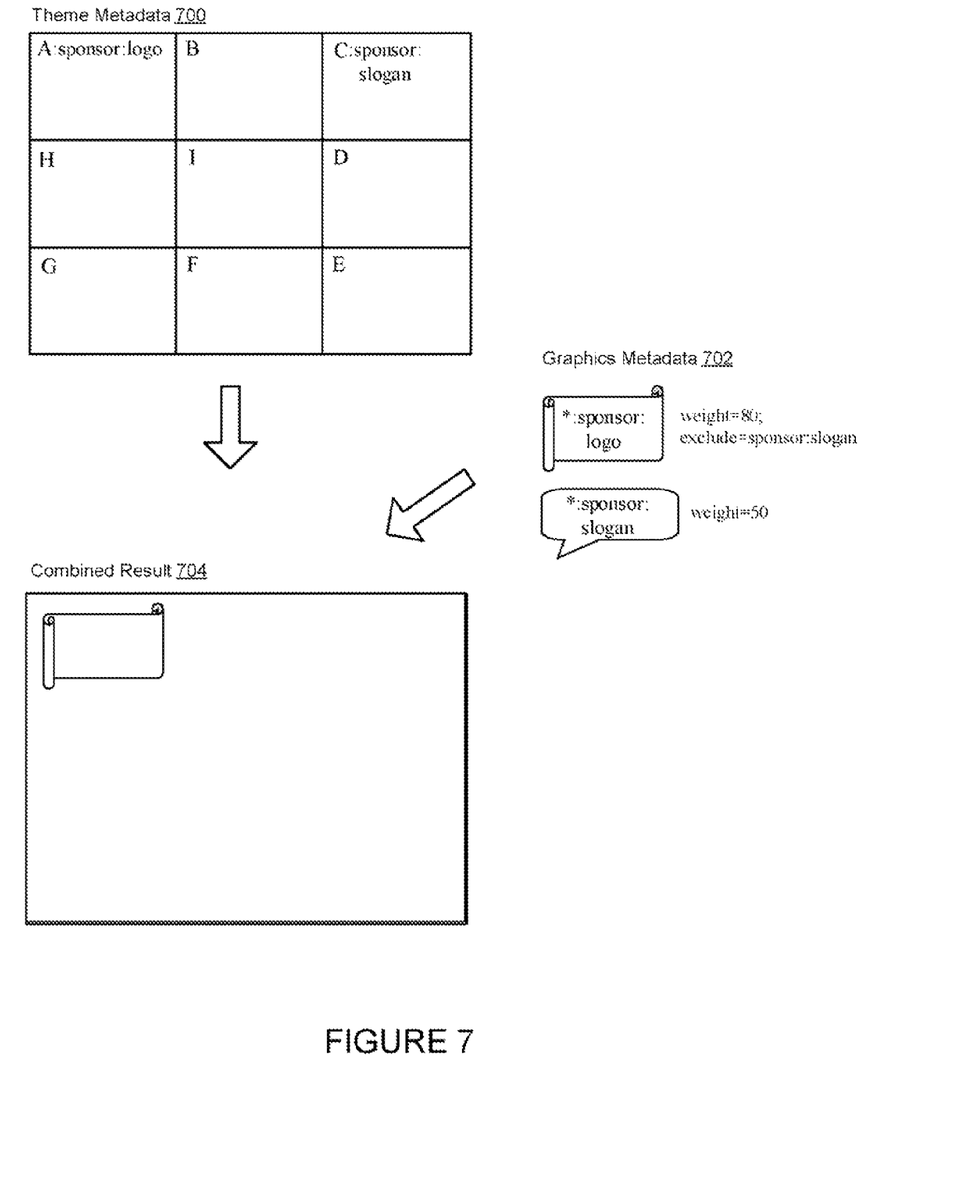
FIG. 7 is an example of weightings and exclusions, in accordance with various embodiments of the invention.

FIG. 7 is an example of weightings and exclusions, in accordance with various embodiments of the invention. In particular, this example illustrates metadata weighting and exclusion rules for the graphic elements. This allows for conditional placement or blocking of placements of other items dependent on metadata rules attached to a given item. An example metadata string for the theme 700 is: "A:sponsor: logo, C:sponsor:slogan".

In this case, the graphic metadata 702 assigns a weight of 80 to the sponsor logo and further includes a tag indicating that the sponsor logo should not appear on the same theme as the sponsor's slogan. The complete metadata string for the graphic elements in this example set might look like the following:

[URL path]/SponsorLogo1.jpg (A:sponsor:logo; weight=80, exclude=sponsor:slogan)

[URL path]/SponsorSlogan1.jpg (*:sponsor:slogan; weight=50)

The combined result 704 illustrates the GUI page after the metadata has been combined, and the graphics rendered into that theme variation by the Rendering Engine. In this case, the basic rules matched for both the sponsor's logo and slogan, but the logo had a metadata tag that indicated that it should not appear on the same theme variation as the sponsor's slogan. (This might be the case, for example, if the sponsor's logo contained the sponsor's slogan as part of it's artwork.) Also, since the sponsor's logo had a higher weight, it got priority in placement over the sponsor's slogan. In this example, the sponsor's slogan would be free to be placed on any theme variation that did not include the sponsor's logo.

The examples provided above serve to illustrate how various metadata rules could be applied to achieve the desired result. Additional rules could be created to achieve further refinements or even different behavior or results while still falling under the scope of this disclosure. Also, differing formats for metadata definitions would work equally well other than what is illustrated in the examples. For example, data structures from various scripting languages could be used, or the data could be expressed in markup, such as extensible markup language (XML), or records and fields in a database.

Figure 8:
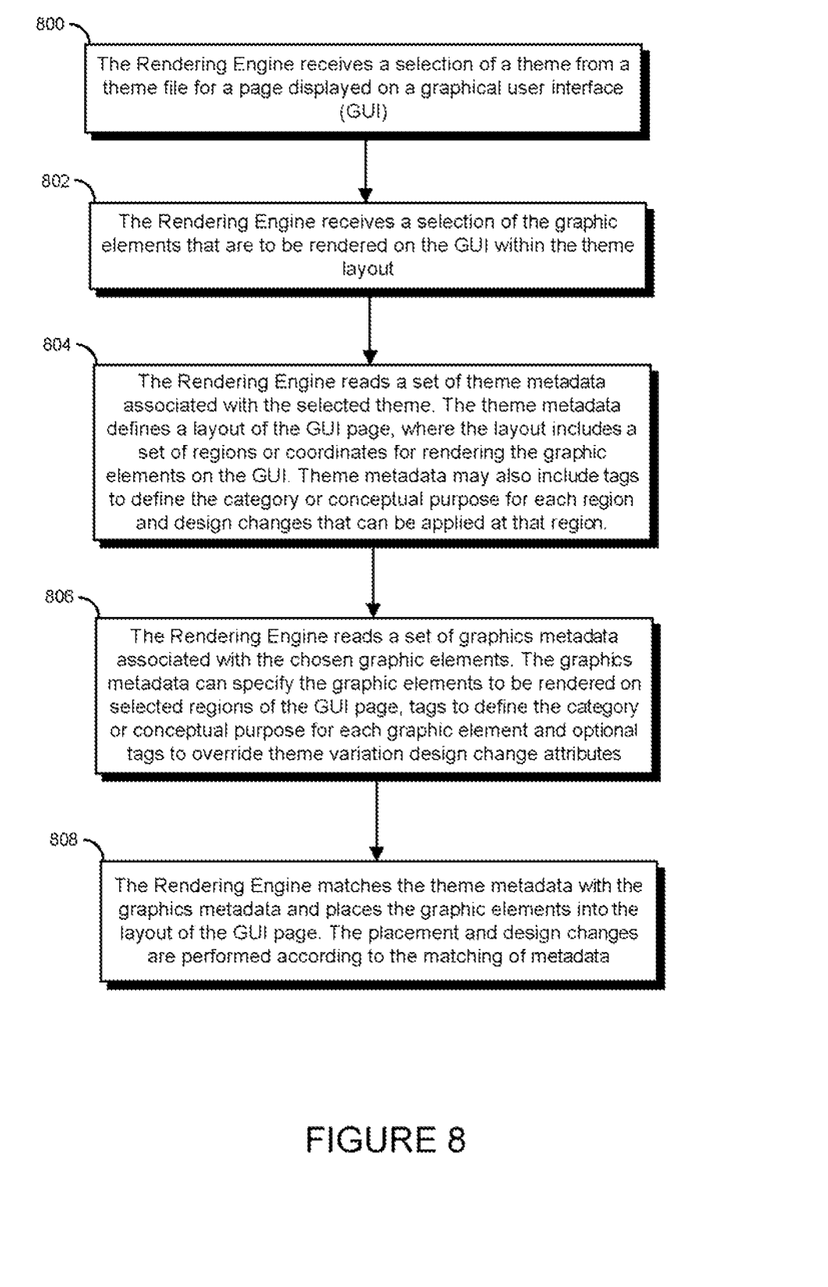
FIG. 8 is a logical flow chart diagram of the process for dynamically placing graphic elements into layouts, in accordance with various embodiments of the invention.

FIG. 8 is a flow chart of the process for dynamically placing graphic elements into layouts, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

In particular, FIG. 8 illustrates a process performed by the Rendering Engine when placing the graphic elements into a theme layout. The process begins in step 800, where the Rendering Engine receives a selection of a theme from a theme file for a page displayed on a graphical user interface (GUI). This selection can be received from a user or automatically assigned. In step 802, the Rendering Engine receives a selection of the graphic elements that are to be rendered on the GUI within the theme layout. The graphic elements can be retrieved from a graphics file or, alternatively, custom graphics can be uploaded by the user.

In step 804, the Rendering Engine reads a set of theme metadata associated with the selected theme. The theme metadata defines a layout of the GUI page, where the layout includes a set of available regions or coordinates for rendering the graphic elements on the GUI. Theme metadata may also include tags to define a category or conceptual purpose for each region and design changes that can be applied at that region. The theme metadata can be stored along with each theme in the theme file or obtained in some other manner.

In step 806, the Rendering Engine reads a set of graphics metadata associated with the chosen graphic elements. The graphics metadata can specify the graphic elements to be rendered on selected regions of the GUI page, tags to define the category or conceptual purpose for each graphic element and optional tags to override theme variation design change attributes. The graphics metadata can be stored with the graphics in the graphics file or can be supplied along with the user-provided graphics.

In step 808, the Rendering Engine matches the theme metadata with the graphics metadata and places the graphic elements into the layout according to the matchings. If multiple graphics match a particular region, a set of matching rules, weightings and/or exclusions can be employed to determine priority between the multiple graphics. Once the graphic elements have been placed into the theme layout, the theme can be used on printed media. For example, a set of digital photographs can be rendered into the theme layouts and the graphics to create a customized printed photo album.

Throughout the various contexts described in this disclosure, the embodiments of the invention can be implemented using computer apparatus, computing systems and/or machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. In various embodiments, the transmission may include a plurality of separate transmissions.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method for dynamic placement of graphic elements into layouts, comprising:
   receiving a selection of a theme for use in placing graphic elements as part of a graphical layout;
   receiving a plurality of the graphic elements to be rendered on the graphical layout;
   processing a set of theme metadata associated with the theme, wherein the theme metadata defines
      a plurality of regions for use in rendering the graphic elements on the graphical layout, and,
      for each region, information describing a category for that region, and optional design parameters to be associated with graphic elements in that region;
   processing a set of graphics metadata associated with the graphic elements, wherein the set of graphics metadata includes rules that define, for each graphic element to be rendered on the graphical layout, those regions of the graphical layout within which the graphic element can be displayed;
   automatically determining a combination of regions with matching graphic elements, by matching region information provided by the theme metadata describing categories for the regions, with the rules provided by the graphics metadata describing those regions of the graphical layout within which each graphic element can be displayed; and
   placing the graphic elements into the graphical layout according to the determined combination of regions and matching graphic elements.

2. The method of claim 1, wherein the theme metadata further includes a set of tags that define for each region, the category for that region.

3. The method of claim 2, wherein the graphics metadata further includes a set of tags that define for each graphic element, those regions of the graphical layout within which the graphic element can be displayed.

4. The method of claim 3, wherein the step of matching the region information provided by the theme metadata with the rules provided by the graphics metadata includes comparing the set of tags of the theme metadata with the set of tags of the graphics metadata.

5. The method of claim 1, wherein the theme metadata further defines one or more design changes that can be applied to the graphic elements after the graphic elements have been placed on the graphical layout.

6. The method of claim 5, wherein the graphics metadata includes a set of overriding tags that override the graphical layout defined by the theme metadata.

7. The method of claim 1, wherein the graphics metadata includes a set of tags defining limitations for acceptable layout changes by an end-user.

8. The method of claim 1, wherein the content of both the theme metadata and graphics metadata are specified as strings, and at least one of the theme metadata and the graphics metadata includes a wild card character that is used during the step of matching to provide more freedom in determining a match between a graphic element and a region of the graphical layout.

9. The method of claim 8, wherein if more than one match is determined between the graphic elements and a particular region of the graphical layout, then randomly selecting one of the graphic elements to be combined with the particular region.

10. The method of claim 8, wherein if more than one match is determined between graphic elements and a particular region of the graphical layout, then selecting, based on round-robin, one of the graphic elements to be combined with the particular region.

11. The method of claim 1, wherein the step of matching the content of the theme metadata with the content of the graphics metadata further includes:
    determining that multiple matches exist between a particular region of the graphical layout and at least two graphic elements; and
    employing a weighting associated with the at least two graphic elements in order to determine a priority of selecting which of the at least two graphic elements is to be placed into the particular region of the graphical layout.

12. The method of claim 11, wherein if the weighting associated with the at least two graphic elements is equal, then one graphic element is randomly selected from the at least two graphic elements.

13. The method of claim 11, wherein if the weighting associated with the at least two graphic elements is equal, then one graphic element is selected, based on round-robin, from the at least two graphic elements.

14. The method of claim 1, wherein the graphics metadata is one of retrieved from a graphics file or uploaded by a user.

15. The method of claim 1, further comprising:
    rendering a set of digital photographs within the graphical layout in addition to the graphic elements placed into the graphical layout; and
    printing a physical media article that includes the digital photographs rendered within the graphical layout.

16. A system for dynamic placement of graphic elements into layouts, comprising:
    a graphical user interface (GUI) for rendering a plurality of graphic elements as part of a graphical layout;
    a set of theme metadata stored on a computer readable storage medium and associated with a theme, wherein the theme metadata defines
       a plurality of regions for use in rendering the graphic elements on the graphical layout, and,
       for each region, information describing a category for that region, and optional design parameters to be associated with graphic elements in that region;
    a set of graphics metadata associated with the graphic elements, wherein the set of graphics metadata includes rules that define, for each graphic element to be rendered on the graphical layout, those regions of the graphical layout within which the graphic element can be displayed; and
    a rendering engine that automatically determines a combination of regions with matching graphic elements, by matching region information provided by the theme metadata describing categories for the regions, with the rules provided by the graphics metadata describing those regions of the graphical layout within which each graphic element can be displayed, and places the graphic elements into the graphical layout according to the determined combination of regions and matching graphic elements.

17. The system of claim 16, wherein the theme metadata further includes a set of tags that define, for each region, the category for that region.

18. The system of claim 17, wherein the graphics metadata further includes a set of tags that define for each graphic element, those regions of the graphical layout within which the graphic element can be displayed.

19. The system of claim 18, wherein the rendering engine compares the set of tags of the theme metadata with the set of tags of the graphics metadata.

20. The system of claim 16, wherein the theme metadata further defines one or more design changes that can be applied to the graphic elements after the graphic elements have been placed on the graphical layout.

21. The system of claim 20, wherein the graphics metadata includes a set of overriding tags that override the graphical layout defined by the theme metadata.

22. The system of claim 16, wherein the content of both the theme metadata and graphics metadata are specified as strings, and at least one of the theme metadata and the graphics metadata includes a wild card character that is used during the step of matching to force a match between a graphic element and a region of the graphical layout.

23. The system of claim 16, wherein if the rendering engine determines that multiple matches exist between a region of the graphical layout and at least two graphic elements employs a weighting associated with the at least two graphic elements in order to determine a priority of selecting which of the at least two graphic elements is to be placed into the particular region of the graphical layout.

24. The system of claim 16, wherein the graphics metadata is one of retrieved from a graphics file or uploaded by a user.

25. A non-transitory computer-readable storage medium storing one or more sequences of instructions which when executed by one or more processors, cause the one or more processors to carry out the steps of:
  receiving a selection of a theme for use in placing graphic elements as part of a graphical layout:
  receiving a plurality of the graphic elements to be rendered on the graphical layout;
  processing a set of theme metadata associated with the theme, wherein the theme metadata defines
    a plurality of regions for use in rendering the graphic elements on the graphical layout, and,
    for each region, information describing a category for that region, and optional design parameters to be associated with graphic elements in that region;
  processing a set of graphic metadata associated with the graphic elements, wherein the set of graphics metadata includes rules that define, for each graphic element to be rendered on the graphical layout, those regions of the graphical layout within which the graphic element can be displayed;
  automatically determining a combination of regions with matching graphic elements, by matching region information provided by the theme metadata describing categories for the regions, with the rules provided by the graphics metadata describing those regions of the graphical layout within which each graphic element can be displayed; and
  placing the graphical elements into the graphical layout according to the determined combination of regions and matching graphic elements.

* * * * *